UNITED STATES PATENT OFFICE.

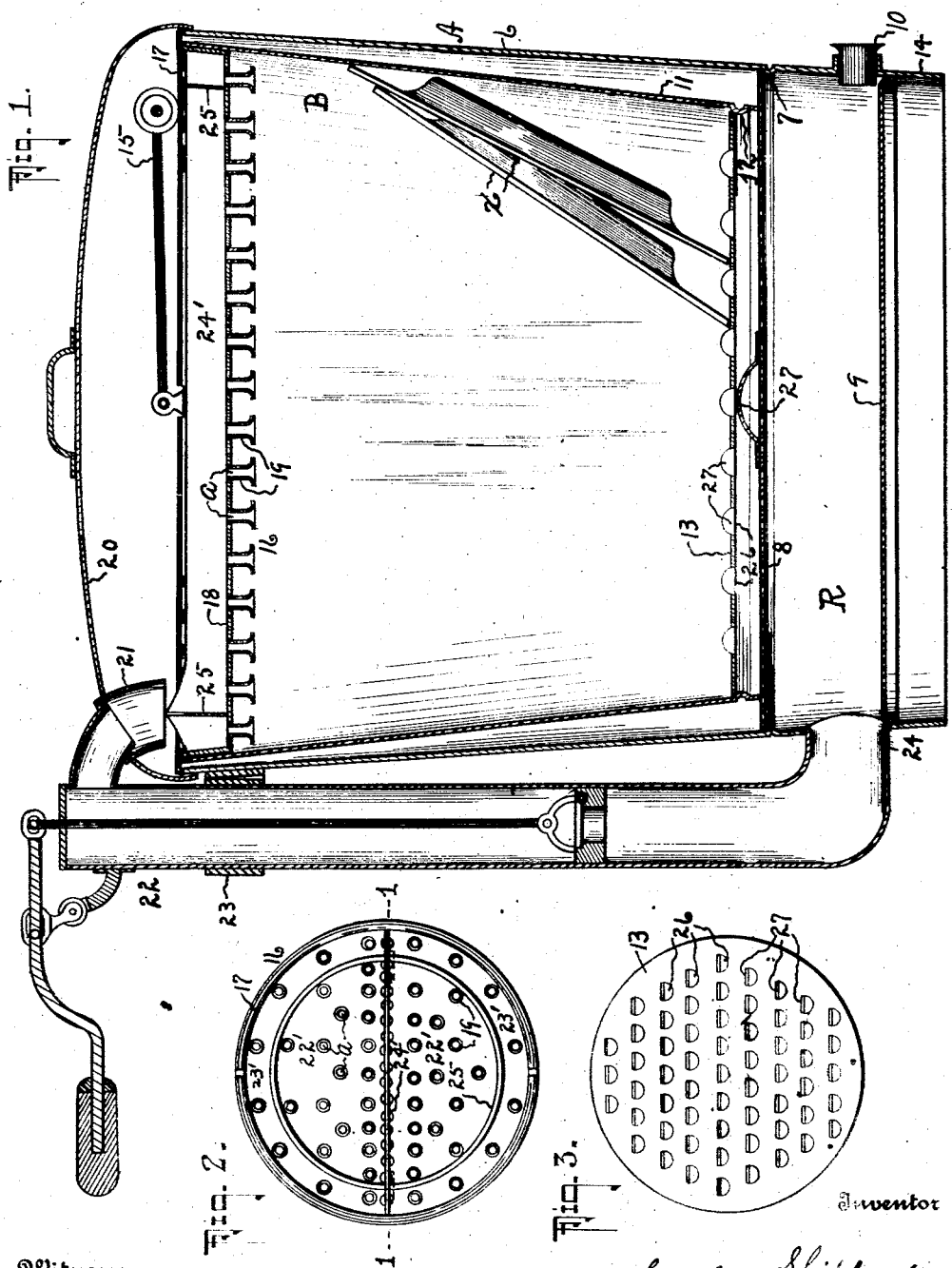

CAROLINE SHIPHERD, OF OMAHA, NEBRASKA.

DISH-WASHING APPARATUS.

1,105,045.   Specification of Letters Patent.   Patented July 28, 1914.

Application filed May 16, 1913. Serial No. 768,115.

*To all whom it may concern:*

Be it known that I, CAROLINE SHIPHERD, a citizen of the United States, residing at Omaha, in the county of Douglas and State of Nebraska, have invented certain new and useful Improvements in Dish-Washing Apparatus, of which the following is a specification.

This invention relates to a dish-washing apparatus and has for its object, broadly, to provide a device for this purpose which will consist of few and simple parts so that it may be economically constructed, and will be convenient and durable in use.
The invention has reference to an apparatus so arranged that its parts may be conveniently separated for cleaning them as often as may be necessary for sanitary requirements; and includes means by use of which hot water may be discharged in a manner to clean and cleanse the dishes without manual handling.

The novel and useful features of the invention are fully described herein and illustrated in the drawings, wherein,—

Figure 1 is a view of the apparatus in longitudinal section, the distributing-pan being shown in section on line 1 1 of Fig. 2. Fig. 2 is a plan view, on a reduced scale, of the distributing-pan. Fig. 3 is a plan view of the dish-holder, on a reduced scale.

Referring now to the drawing for a more particular description, the apparatus consists, in part, of a cylindrical tank A having a downwardly convergent wall 6 provided with an inwardly projecting annular ridge 7 for the support of a removable strainer 8, the bottom of the tank being indicated at 9; and in wall 6, adjacent to the bottom, is provided a discharge passageway with a suitable plug 10.

I provide a dish-holder or cylindrical receptacle B having a downwardly-convergent wall 11, the degree of convergence being greater than that of wall 6, and it is provided near its lower open end with an inwardly projecting ridge 12 for sustaining the apertured tray or dish-support 13 to be disposed removably thereon.
Wall 6 projects below the bottom of the tank to provide the bearing-flange 14 so that said bottom will not become injured or unduly worn, and as thus described, receptacle B, by use of its bail 15, is placed within tank A, its weight being supported upon strainer 8, and it may be removed therefrom whenever desired.

At 16 is indicated a distributing pan provided with a roll or outwardly-projecting flange 17 at the terminal of its upright wall so that it will catch upon the upper terminal of wall 11 of the cylindrical receptacle B for a support when disposed therein. It has a bottom 18 provided with numerous discharge apertures *a* and with downwardly-projecting, outwardly-divergent nozzles 19; and when water passes therethrough, the nozzles prevent water from adhering to the lower surface of the bottom 18, and cause it to be discharged downwardly within receptacle B, and the divergently formed nozzles tend to cause the water to be divided in its movement and to be discharged as a spray.

A cover for the tank is indicated at 20 and preferably it is provided near one of its edges with a sleeve or funnel 21 to provide an intake passageway for water to be discharged from the piston pump 22, said pump preferably having its cylinder secured to the upper part of the tank by means of collar 23 and having a pipe 24 communicating with its cylinder from that part of the tank below the strainer 8.

In order that the supply of water delivered by the pump to sleeve 21 may be more equally distributed to pan 16, an arrangement of compartments 22' and 23' (Fig. 3.) of substantially equal area is made for said pan by use of the partition 24' extending diametrically across the pan, and the annular partition 25 which intersects partition 24'.

In operation, after a supply of hot water has been placed in the tank, the dishes to be washed are placed in receptacle B, and the distributing-pan is then mounted upon said receptacle; the cover is then placed upon the tank and is so disposed that the intersecting portions of partitions 24' and 25 will lie immediately below the middle of sleeve 21. The apertures of tray 13 are indicated at 26, and said tray is provided with upright detents or upset lugs 27 adjacent to each aperture. In practice, a solution of lye may be mixed with the water in the tank, or washing-powder may be sprinkled upon the distributing pan, and by use of the pump the hot water will be discharged therefrom and will pass through nozzles 19 to fall upon the dishes. The dishes X within receptacle B may be disposed upright or horizontally and lugs 27 provide supports therefor. The water, after passing through the strainer may again be elevated by the pump and passed through nozzles 19 and the operation may be continued until the dishes are clean. It will be understood that crumbs or small particles of food will be caught by the strainer, and therefore the water reservoir R, or that part of the tank below the strainer, will be practically free from obstructions. By use of the plug 10 the water may be drawn from the reservoir; and the receptacle B, the strainer, tray and distributing pan may be removed and cleansed. The strainer, preferably, is provided at its middle with an upwardly-projecting handle 27, and when the parts are assembled it is adapted to engage the middle of the tray and operate as a support therefor.

Among some of the advantages to be derived from the invention, it may be said that it provides an apparatus which may be constructed for the most part of sheet metal, and at comparatively a moderate cost. Also it is of compact form and may be conveniently moved and arranged ready for use. Dish-cleaning devices generally require frequent cleaning or sterilization, and as has been explained, the several parts may be readily separated for this purpose.

Having fully explained my invention, what I claim and desire to secure by Letters Patent is,—

1. A dish-washing apparatus, comprising, in combination with an upright tank adapted to contain water and provided between its ends with a strainer, a cylindrical receptacle having an apertured bottom and supported by the strainer while disposed within said tank; a distributing-pan adapted to be removably mounted in the cylindrical receptacle and having upright, intersecting partitions to form compartments with apertured bottoms; and a pump arranged for moving the water from the tank and discharging it within the compartments of the distributing-pan.

2. A dish-washing apparatus, comprising, in combination with an upright tank adapted to contain water and provided between its ends with a strainer, a cylindrical receptacle having an apertured bottom and supported by the strainer while disposed within said tank; a distributing-pan adapted to be removably mounted in the cylindrical receptacle and having upright partitions with intersecting portions to form compartments with apertured bottoms; a cover provided with a sleeve and adapted to be removably mounted on the tank with the longitudinal middle of its sleeve disposed above the intersecting portions of said partitions; and a pump arranged for moving the water from the tank and discharging it within the sleeve of said cover.

3. A dish-washing apparatus, comprising, in combination with an upright tank, a strainer removably mounted within and above the lower end of the tank, a cover provided with a sleeve and adapted to be removably mounted upon the tank; a cylindrical receptacle supported by the strainer while disposed within said tank; a distributing-pan having a bottom provided with apertures and removably mounted in the cylindrical receptacle; and a pump having a cylinder in communication with the tank below said strainer and arranged to discharge water within the sleeve of said cover.

In testimony whereof I have affixed my signature in presence of two witnesses.

CAROLINE SHIPHERD.

Witnesses:
 HIRAM A. STURGES,
 ARTHUR H. STURGES.